US007852649B2

(12) United States Patent
Hsiao

(10) Patent No.: US 7,852,649 B2
(45) Date of Patent: Dec. 14, 2010

(54) POWER SUPPLY WITH A FEEDBACK CIRCUIT RELIEVING SPIKES

(75) Inventor: Chien-Chung Hsiao, Taoyuan County (TW)

(73) Assignee: Young Green Energy Co., Hukou Township, Hsinchu County (TW)

( * ) Notice: Subject to any disclaimer, the term of this patent is extended or adjusted under 35 U.S.C. 154(b) by 478 days.

(21) Appl. No.: 11/941,068

(22) Filed: Nov. 15, 2007

(65) Prior Publication Data

US 2008/0304294 A1 Dec. 11, 2008

(30) Foreign Application Priority Data

Jun. 7, 2007 (TW) .............................. 96120535 A

(51) Int. Cl.
*H02M 7/5395* (2006.01)
(52) U.S. Cl. ...................................................... 363/97
(58) Field of Classification Search .................. 363/78, 363/84, 89, 95, 97, 98
See application file for complete search history.

(56) References Cited

U.S. PATENT DOCUMENTS

| 5,120,986 | A | * | 6/1992 | Shekhawat | ................... | 327/129 |
| 5,572,416 | A | * | 11/1996 | Jacobs et al. | ................... | 363/89 |
| 5,747,982 | A | * | 5/1998 | Dromgoole et al. | ...... | 363/21.15 |
| 6,625,046 | B2 | * | 9/2003 | Geissler | ........................ | 363/89 |
| 7,019,503 | B1 | * | 3/2006 | Ortiz et al. | ................... | 323/282 |
| 2006/0126367 | A1 | * | 6/2006 | Hesterman | ................... | 363/89 |
| 2009/0190382 | A1 | * | 7/2009 | Usui | ........................... | 363/89 |
| 2009/0262562 | A1 | * | 10/2009 | Yang | ............................ | 363/84 |

* cited by examiner

*Primary Examiner*—Jeffrey L Sterrett
(74) *Attorney, Agent, or Firm*—Winston Hsu; Scott Margo

(57) ABSTRACT

In a feedback circuit of a power supply, an electrical level of an output voltage is stabilized corresponding to changes of an electrical level of a pulse width modulation signal, and effects, which are caused by spikes, on passive elements are decreased to a lowest degree. The electrical level of the output voltage is stabilized by storing a voltage corresponding to a low-to-high electrical level of the PWM signal with a capacitor, by discharging the stored voltage with a high-to-low electrical level of said PWM signal, and by regulating a discharging path of the stored voltage with a diode, which is not conducted. The abovementioned disposition may be utilized on various power-consuming devices, a duty cycle of each of which is controlled with a PWM signal, for stabilizing output voltages of said power-consuming devices, and for reducing effects, which are caused by spikes, on passive elements inside said power-consuming devices.

10 Claims, 5 Drawing Sheets

POWER SUPPLY WITH A FEEDBACK CIRCUIT RELIEVING SPIKES

BACKGROUND OF THE INVENTION

1. Field of the Invention

The present invention relates to a power supply, and more particularly, to a power supply for relieving spikes.

2. Description of the Prior Art

Conventional passive elements have their respective operating voltage ranges or operating current ranges. When the conventional passive elements are not operated under their operating voltage ranges or their operating current ranges, the passive elements do not operate normally or exceed their loadings so that permanent damage is caused. For neutralizing these defects resulting from applying inappropriate operating voltages or inappropriate operating currents, certain controlling mechanisms are used on various circuits for limiting their operating voltages or operating currents within appropriate ranges. Various techniques are also utilized for protecting passive elements inside a same circuit.

Please refer to FIG. 1, which is a diagram of a conventional power supply 100, where a feedback controlling mechanism is utilized on the power supply 100 with the aid of constant voltages and constant currents. The power supply 100 includes a transformer 102, a diode 104, a first capacitor 106, an inductor 108, a second capacitor 110, a first resistor 112, a switch 114, a plurality of light emitting diodes 116 connected in series, a second resistor 118, a third resistor 120, a feedback circuit 122, and a pulse width modulation (PWM) integrated circuit 124. An input voltage source $V_{in}$ is coupled to a first input terminal of the transformer 102. The diode 104 has a first terminal coupled to a first output terminal of the transformer 102. The first capacitor 106 has a first terminal coupled to a second terminal of the diode 104, and a second terminal coupled to both ground and a second output terminal of the transformer 102. The inductor 108 has a first terminal coupled to a second terminal of the diode 104. The second capacitor 110 has a first terminal coupled to a second terminal of the inductor 108, and a second terminal coupled to the second terminal of the first capacitor 106. The plurality of light emitting diodes 116 has a first terminal coupled to a second terminal of the inductor 108. The first resistor 112 has a first terminal coupled to the second terminal of the second capacitor 110. The switch 114 may be an N-type metal oxide semiconductor transistor or a P-type metal oxide semiconductor transistor. The switch 114 has a first terminal coupled to a second terminal of the plurality of light emitting diodes 116, a base coupled to a pulse width modulation signal source PWM2, and a second terminal coupled to a second terminal of the first resistor 112. The second resistor 118 has a first terminal coupled to the second terminal of the inductor 108. The third resistor 120 has a first terminal coupled to a second terminal of the second resistor 118, and a second terminal coupled to ground. The feedback circuit 122 includes a first operational amplifier 126 and a second operational amplifier 128. The first operational amplifier 126 has a positive input terminal coupled to a reference voltage source $V_{ref}$, and a negative input terminal coupled to the second terminal of the switch 114. The first operational amplifier 126 is utilized for receiving a voltage difference across the first resistor 112, where the voltage difference is generated from a constant current outputted from the second terminal of the switch 114 and passing through the first resistor 112. A constant current controlling mechanism of the power supply 100 is accomplished by comparing the reference voltage source $V_{ref}$ with the voltage difference across the first resistor 112 with the aid of the first operational amplifier 126, where the constant current is generated from a feedback voltage, which is generated by the voltage at the first output terminal of the transformer 102 and the plurality of light emitting diodes 116. The second operational amplifier 128 has a positive input terminal coupled to the reference voltage source $V_{ref}$, and a negative input terminal coupled to the first terminal of the third resistor 120. The second operational amplifier 128 is utilized for receiving a divided voltage at the intersection of the second resistor 118 and the third resistor 120, where variable resistance is inducted from the second resistor 118 and the third resistor 120. The divided voltage is generated as part of the voltage at the first output terminal of the transistor 102, and is outputted into the feedback circuit 122. When the voltage at the first output terminal of the transformer 102 is constant, the divided voltage must be a constant voltage also. Therefore, the constant voltage controlling mechanism of the power supply 100 is implemented by comparing the reference voltage source $V_{ref}$ with the constant divided voltage with the aid of the second operational amplifier 128. The PWM integrated circuit 124 has an input terminal coupled to an output terminal of the feedback circuit 122 so as to generate a pulse width modulation signal PWM1 according to a control signal, which is generated by the feedback circuit 122 according to the constant voltage controlling mechanism or the constant current controlling mechanism. The PWM integrated circuit 124 has an output terminal coupled to a second input terminal of the transformer 102 so as to control both a duty cycle and an output voltage of the transformer 102 according to the generated pulse width modulation signal PWM1. Primary characteristics of the power supply 100 shown in FIG. 1 lie in the constant voltage controlling mechanism and the constant current controlling mechanism, each of which takes AC or DC input voltages and cooperates with two operational amplifiers respectively.

When the pulse width modulation signal PWM2 is high, the switch 114 is switched on so that the plurality of light emitting diodes 116 connected in series is conducted. At this time, with the aid of the constant voltage and current controlling mechanisms, the duty cycle of the pulse width modulation signal PWM1 is lengthened so that the duty cycle of the output signal of the transformer 102 is lengthened as well, and the loading of the plurality of light emitting diodes 116 is thus increased. Therefore, when the pulse width modulation signal PWM2 is low then, the switch 114 is switched off so that the plurality of the light emitting diodes 116 is not conducted. At this time, according to the constant voltage and current controlling mechanisms, the duty cycle of the pulse width modulation signal PWM1 is shortened so that the duty cycle of the output signal of the transformer 102 is shortened as well, and the loading of the plurality of light emitting diodes 160 is decreased. With alternative high and low of the pulse width modulation signal PWM2, average loading of the plurality of light emitting diodes 116 is decreased to a certain degree.

However, under such controlling mechanisms, instant and severe variations in voltage or current may still damage the plurality of light emitting diodes 116. Please refer to FIG. 2, which is a schematic diagram of the operating voltage, i.e., the voltage difference, across the plurality of light emitting diodes 116 versus the voltage level of the pulse width modulation signal PWM2 while the plurality of light-emitting diodes 116 is under external luminance-modulation. The term "external luminance-modulation" indicates the function of modulating luminance of light-emitting electronic products, such as televisions, with the aid of external devices, such as remote controllers. For example, the operating voltage of a single light emitting diode 116 is assumed to be 3.5 volts, and the number of the plurality of light emitting diodes 116 is assumed to be 10. Therefore, the operating voltage of the plurality of light emitting diodes 116, which varies with the voltage level of the pulse width modulation signal PWM2, ranges between 30 and 40 volts. However, when the pulse width modulation signal PWM2 is switched from low to high, i.e., from off to on, violent voltage variation is generated on the operating voltage of the plurality of light emitting diodes 116, where the voltage variation is illustrated in the form of area surrounded with a dotted line in FIG. 2. The voltage variation inducts additional burst current into the plurality of light emitting diodes 116 so that the lifespan of the plurality of light emitting diodes 116 is shortened.

Please refer to FIG. 3, which is a schematic diagram of the operating voltage of the plurality of light emitting diodes 116 versus the operating current of the plurality of light emitting diodes 116 while the plurality of light-emitting diodes 116 is under external luminance-modulation. The curve LED indicates the characteristic curve of a single light emitting diode 116, whereas both the other curves LED1 and LED2 define a supposed upper bound and a supposed lower bound of the characteristic curve of the plurality of light emitting diodes 116. Since different light emitting diodes 116 have slightly different characteristics because of fabrication procedure, the characteristic curve of the plurality of light emitting diodes 116 has difference with the characteristic curve of a single light emitting diode 116 and lies between the characteristic curves LED1 and LED2. In other words, when the plurality of light emitting diodes 116 is biased according to the characteristic curve of a single light emitting diode 116 without taking differences in fabrication procedure into consideration, unexpected burst voltages and burst currents are generated so that the plurality of light emitting diodes 116 suffer damage and shortened lifespan of different degrees.

SUMMARY OF THE INVENTION

The claimed invention discloses a power supply for relieving spikes. The power supply comprises a power supplying circuit, a power controlling circuit, a first switch, a pulse width modulation signal source, and a feedback circuit. The power controlling circuit has an output terminal coupled to an input terminal of the power supplying circuit. The pulse width modulation signal source is coupled to a first terminal of the first switch. The feedback circuit comprises a first operational amplifier, a first resistor, a first diode, a first capacitor, a second resistor, a second diode, a third resistor, a second operational amplifier, and a fourth resistor. The first operational amplifier has a first input terminal coupled to a first reference voltage source, and a second input terminal coupled to a second terminal of the first switch. The first resistor has a first terminal coupled to an output terminal of the first operational amplifier. The first diode has a first terminal coupled to a second terminal of the first resistor. The first capacitor has a first terminal coupled to a second terminal of the first diode, and a second terminal coupled to ground. The second resistor has a first terminal coupled to the second terminal of the first diode. The second diode has a first terminal coupled to a second terminal of the second resistor. The third resistor has a first terminal coupled to a second terminal of the second diode, and a second terminal coupled to the second terminal of the first capacitor. The second operational amplifier has a first input terminal coupled to a second reference voltage source, a second input terminal coupled to the second terminal of the second diode, and an output terminal coupled to an input terminal of the power controlling circuit. The fourth resistor has a first terminal coupled to the output terminal of the second operational amplifier, and a second terminal coupled to the first terminal of the third resistor.

Other objectives, features and advantages of the present invention will be further understood from the further technology features disclosed by the present invention wherein there are shown and described preferred embodiments of this invention, simply by way of illustration of modes best suited to carry out the invention.

These and other objectives of the present invention will no doubt become obvious to those of ordinary skill in the art after reading the following detailed description of the preferred embodiment that is illustrated in the various figures and drawings.

DETAILED DESCRIPTION

It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled," and variations thereof herein are used broadly and encompass direct and indirect connections, couplings, and mountings.

A power supply for relieving spikes is disclosed in the present invention. Other objectives and advantages are fully understood from the following disclosures.

Figure 4:
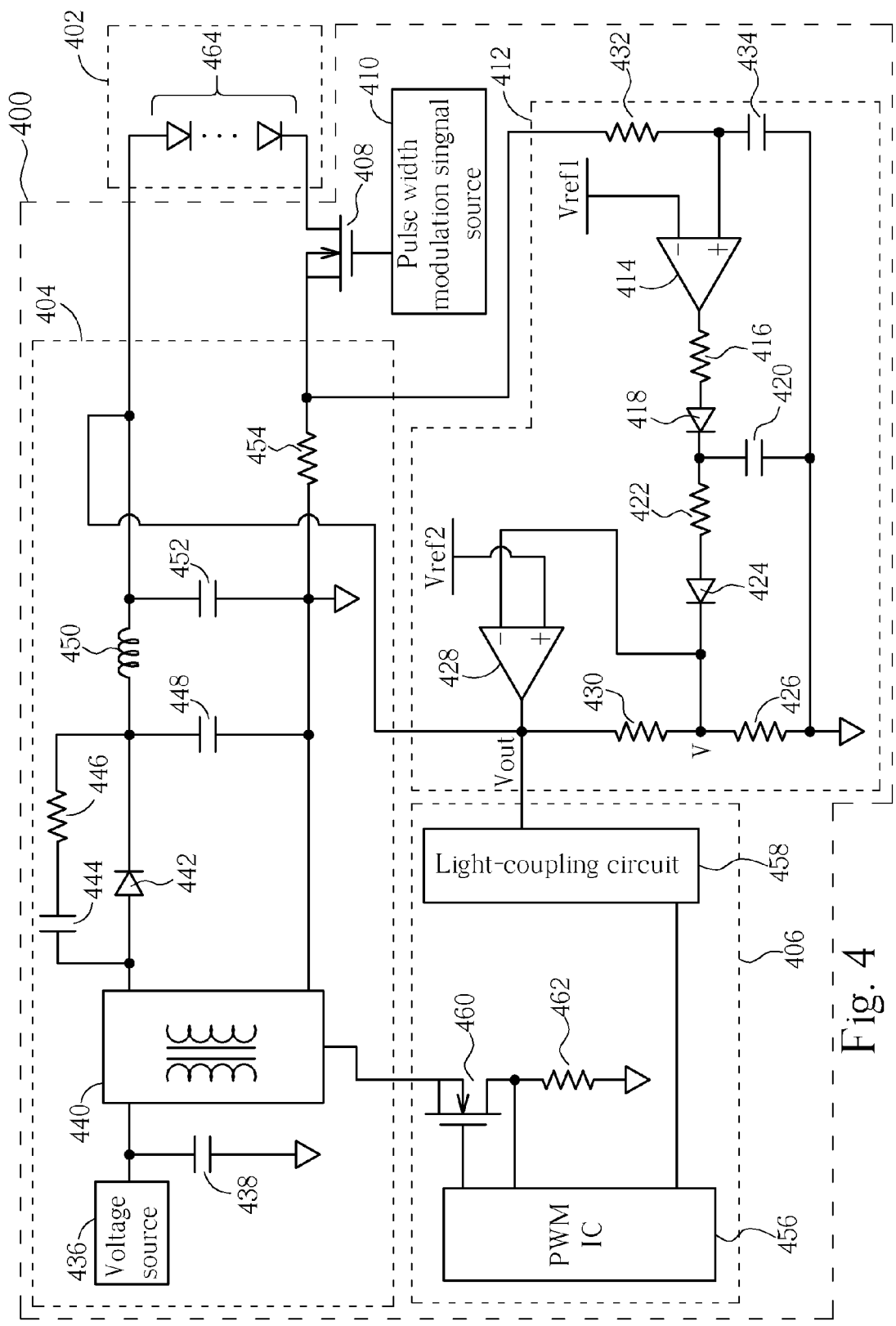
FIG. 4 is a diagram of a power supply according to a preferred embodiment of the present invention.

Please refer to FIG. 4, which is a diagram of a power supply 400 according to a preferred embodiment of the present invention. The power supply 400 includes a power supplying circuit 404, a power controlling circuit 406, a first switch 408, a pulse width modulation (PWM) signal source 410, and a feedback circuit 412. The power controlling circuit 406 has an output terminal coupled to an input terminal of the power supplying circuit 404 for controlling both the voltage level of the output voltage and the duty cycle of the power supplying circuit 404. The PWM signal source 410 is coupled to a first terminal of the first switch 408 so as to control both the state and the duty cycle of the first switch 408 with pulse width modulation signal output by the PWM signal source 410. In a preferred embodiment of the present invention, the first switch 408 is implemented with a transistor, such as an N-type metal oxide semiconductor transistor or a P-type metal oxide semiconductor transistor. Besides, the power supplying circuit 404 has a first output terminal coupled to an input terminal of a light module 402 for supplying power for the light module 402. Note that the power supply 400 may also be applied on various types of modules other than the light module 402 so that the light module 402 is not limitations to applications of the present invention.

The feedback circuit 412 includes a first operational amplifier 414, a first resistor 416, a first diode 418, a first capacitor 420, a second resistor 422, a second diode 424, a third resistor 426, a second operational amplifier 428, and a fourth resistor 430. In another embodiment of the present invention, the feedback circuit 412 further includes a fifth resistor 432 and a second capacitor 434, both of which constitute a low pass filter for filtering off noises from entering the first operational amplifier 414. The following descriptions are based on the existences of both the fifth resistor 432 and the second capacitor 434, though both the fifth resistor 432 and the second capacitor 434 are optional in embodiments of the present invention. The fifth resistor 432 has a first terminal coupled to a second terminal or a source of the first switch 408. The first operational amplifier 414 has a first negative input terminal coupled to a first reference voltage source $V_{ref1}$, and a second positive input terminal coupled to the second terminal or the source of the first switch 408 via the fifth resistor 432. The first resistor 416 has a first terminal coupled to an output terminal of the first operational amplifier 414. The first diode 418 has a first terminal coupled to a second terminal of the first resistor 416. The first capacitor 420 has a first terminal coupled to a second terminal of the first diode 418, and a second terminal coupled to ground. The second capacitor 434 has a first terminal coupled to a second terminal of the fifth resistor 432, and a second terminal coupled to the second terminal of the first capacitor 420. The second resistor 422 has a first terminal coupled to the second terminal of the first diode 418. The second diode 424 has a first terminal coupled to a second terminal of the second resistor 422. The third resistor 426 has a first terminal coupled to a second terminal of the second diode 424, and a second terminal coupled to the second terminal of the first capacitor 420. The second operational amplifier 428 has a first positive input terminal coupled to a second reference voltage source $V_{ref2}$, a second negative input terminal coupled to the second terminal of the second diode 424, and an output terminal coupled to an input terminal of the power controlling circuit 406. The fourth resistor 430 has a first terminal coupled to the output terminal of the second operational amplifier 428, and a second terminal coupled to the first terminal of the third resistor 426.

The power supplying circuit 404 includes a voltage source 436, a third capacitor 438, a transformer 440, a third diode 442, a fourth capacitor 444, a sixth resistor 446, a fifth capacitor 448, an inductor 450, a sixth capacitor 452, and a seventh resistor 454. The voltage source 436 is a DC voltage source or an AC voltage source, especially a domestic AC voltage source. The third capacitor 438 has a first terminal coupled to the voltage source 436, and a second terminal coupled to ground. The transformer 440 has a first input terminal coupled to the first terminal of the third capacitor 438, a second input terminal coupled to the output terminal of the power controlling circuit 406, and a first output terminal coupled to ground. The third diode 442 has a first terminal coupled to a second output terminal of the transformer 440. The fourth capacitor 444 has a first terminal coupled to the first terminal of the third diode 442. The sixth resistor 446 has a first terminal coupled to a second terminal of the fourth capacitor 444, and a second terminal coupled to a second terminal of the third diode 442. The fifth capacitor 448 has a first terminal coupled to the second terminal of the third diode 442, and a second terminal coupled to the first output terminal of the transformer 440. The inductor 450 has a first terminal coupled to the second terminal of the third diode 442. The sixth capacitor 452 has a first terminal coupled to a second terminal of the inductor 450, and a second terminal coupled to the first output terminal of the transformer 440. The seventh resistor 454 has a first terminal coupled to the first output terminal of the transformer 440, and a second terminal coupled to the second terminal or the source of the first switch 408.

The power controlling circuit 406 includes a PWM circuit 456, a light coupling circuit 458, a second switch 460, and an eighth resistor 462. The light coupling circuit 458 has an input terminal coupled to the output terminal of the second operational amplifier 428 for coupling to the feedback circuit 412, and an output terminal coupled to an input terminal of the PWM circuit 456. In a preferred embodiment of the present invention, the second switch 460 is a transistor, such as an N-type metal oxide semiconductor transistor or a P-type metal oxide semiconductor transistor. The second switch 460 has a first terminal or a gate coupled to a first output terminal of the PWM circuit 456, a second or a source coupled to a second output terminal of the PWM circuit 456, and a third terminal or a drain coupled to the input terminal of the power supplying circuit 404. The eighth resistor 462 has a first terminal coupled to the second output terminal of the PWM circuit 456, and a second terminal coupled to ground. The design purpose of the light coupling circuit 458 is to electrically isolate primary from secondary in the power supply 400, where the primary in the power supply 400 indicates the part closer to the voltage source 436, i.e., closer to domestic sockets, and the secondary in the power supply is the part closer to user, i.e., the part around the feedback 412. Note that in electric safety regulations, the secondary is more strictly regulated than the primary. Implementations of the light coupling circuit 458 is known by those who skilled in the art so as not to be described further.

In a preferred embodiment of the present invention, the light module 402 includes a plurality of light emitting diodes 464 connected in series, and provides power for the plurality of light emitting diodes 464 with the output voltage at the output terminal of the second operational amplifier 428.

Compared with the conventional power supply 100, the power supply 400 of the present invention has improvements on the feedback 412 for reaching the aim of reducing the influence of burst currents and burst voltages, i.e., relieving spikes, to a smallest degree under the constant current controlling mechanism and the constant voltage controlling mechanism. Note that other implementations of the power supplying circuit 404 and the power controlling circuit 406 are not limitations to the present invention.

How the feedback circuit 412 works is described as follows. Since the gate of the first switch 408 is coupled to the PWM signal source 410, both the state and the duty cycle of the first switch 408 is determined according to the voltage level of the PWM signal source 410. When the power supply 400 is initiated, and when the voltage level of the PWM signal source 410 is low, the first switch 408 is switched off so that the voltage level of the input voltage at the positive input terminal of the first operational amplifier 414 is 0. After comparing the input voltage with the reference voltage $V_{ref1}$ at the negative input terminal of the first operational amplifier 414, a negative output voltage is generated at the output terminal of the first operational amplifier 414. At this time, the first diode 418 having a negative voltage difference is not conducted so that the first capacitor 420 is not charged; no current flows through both the second resistor 422 and the second diode 424; there is no voltage difference on the third resistor 426 for performing the constant current controlling mechanism; and thus the light module 402 is not damaged by an overly-high voltage at the output terminal of the second operational amplifier 428. Note that a voltage V, which is at the intersection of the third resistor 426 and the fourth 430, may be expressed in terms of an output voltage $V_{out}$ as follows:

$$V = V_{out} * \frac{R_2}{R_1 + R_2} \quad (1)$$

, where $R_1$ indicates the resistance of the fourth resistor 430, $R_2$ indicates the resistance of the third resistor 426. As can be observed in the equation (1), the output voltage $V_{out}$ at the output terminal of the second operational amplifier 428 is adjusted with the constant voltage controlling mechanism based upon the voltage V and both the resistances $R_1$ and $R_2$. Therefore, the output voltage at the output terminal of the second operational amplifier 428 is stabilized so as to protect the light module 402.

When the voltage level at the PWM signal source 410 is switched from low to high, the first switch 408 is switched on, and a voltage difference is generated on the fifth resistor 432 after a current passes therethrough. The voltage difference is then inputted at the positive input terminal of the first operational amplifier 414 so as to be compared with the reference voltage $V_{ref1}$. Since the voltage difference is higher than the reference voltage $V_{ref1}$ at this time, a high output voltage is generated at the output terminal of the first operational amplifier 414. The first capacitor 420 is charged with the high output voltage through both the first resistor 416 and the first diode 418, and a discharging current is also generated so as to flow through the second resistor 422 and the second diode 424 and to reach the third resistor 426. At this time, a voltage difference is also generated on the third resistor 426 and is inputted at the negative input terminal of the second operational amplifier 428. Then a corresponding output voltage is generated at the output terminal of the second operational amplifier 428 and inputted at the input terminal of the light module 402 as a feedback so as to modulate a receiving voltage of the light module 402 to a predetermined voltage.

Figure 1:
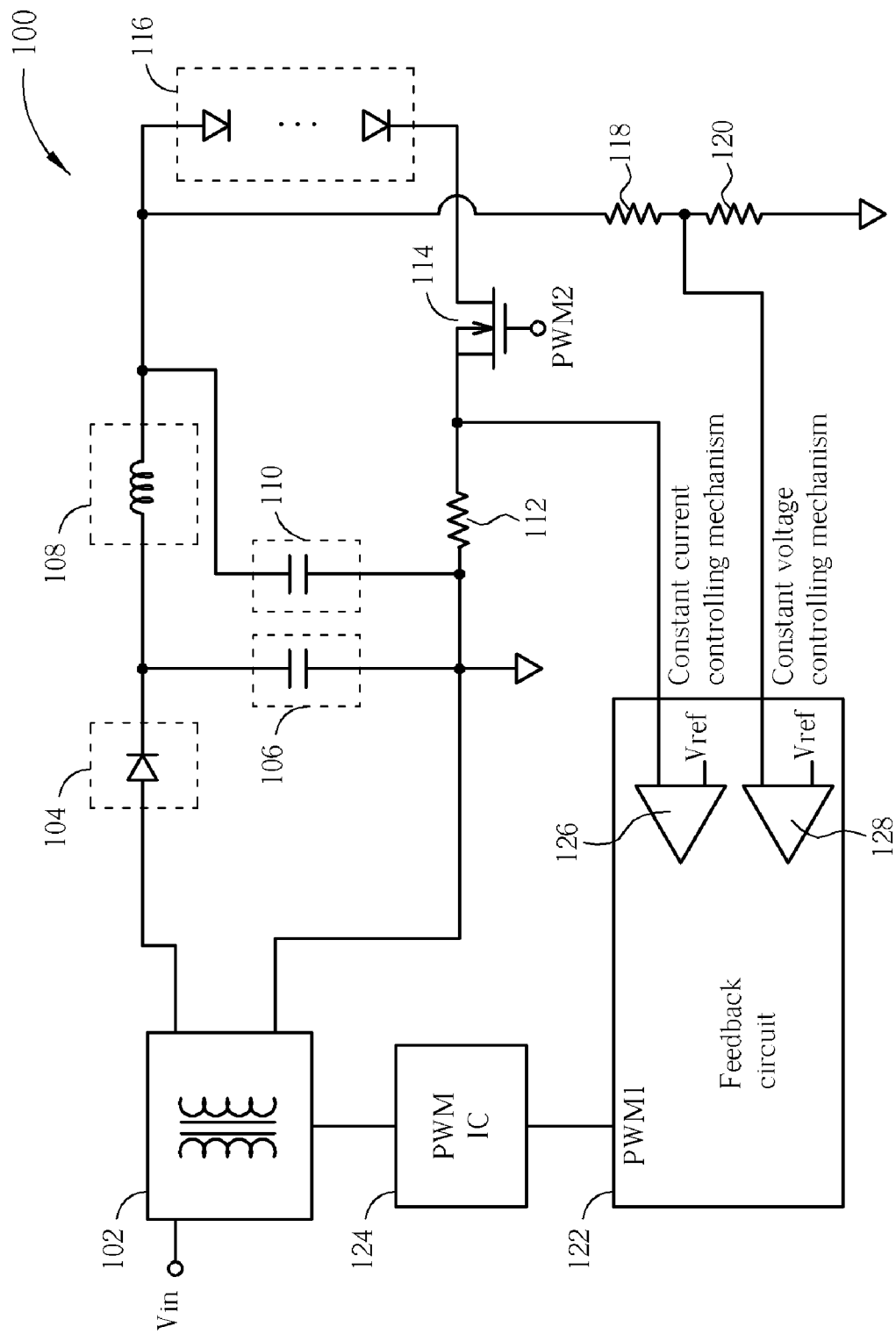
FIG. 1 is a diagram of a conventional power supply, where a feedback controlling mechanism is utilized on the conventional power supply with the aid of constant voltages and constant currents.
Figure 2:
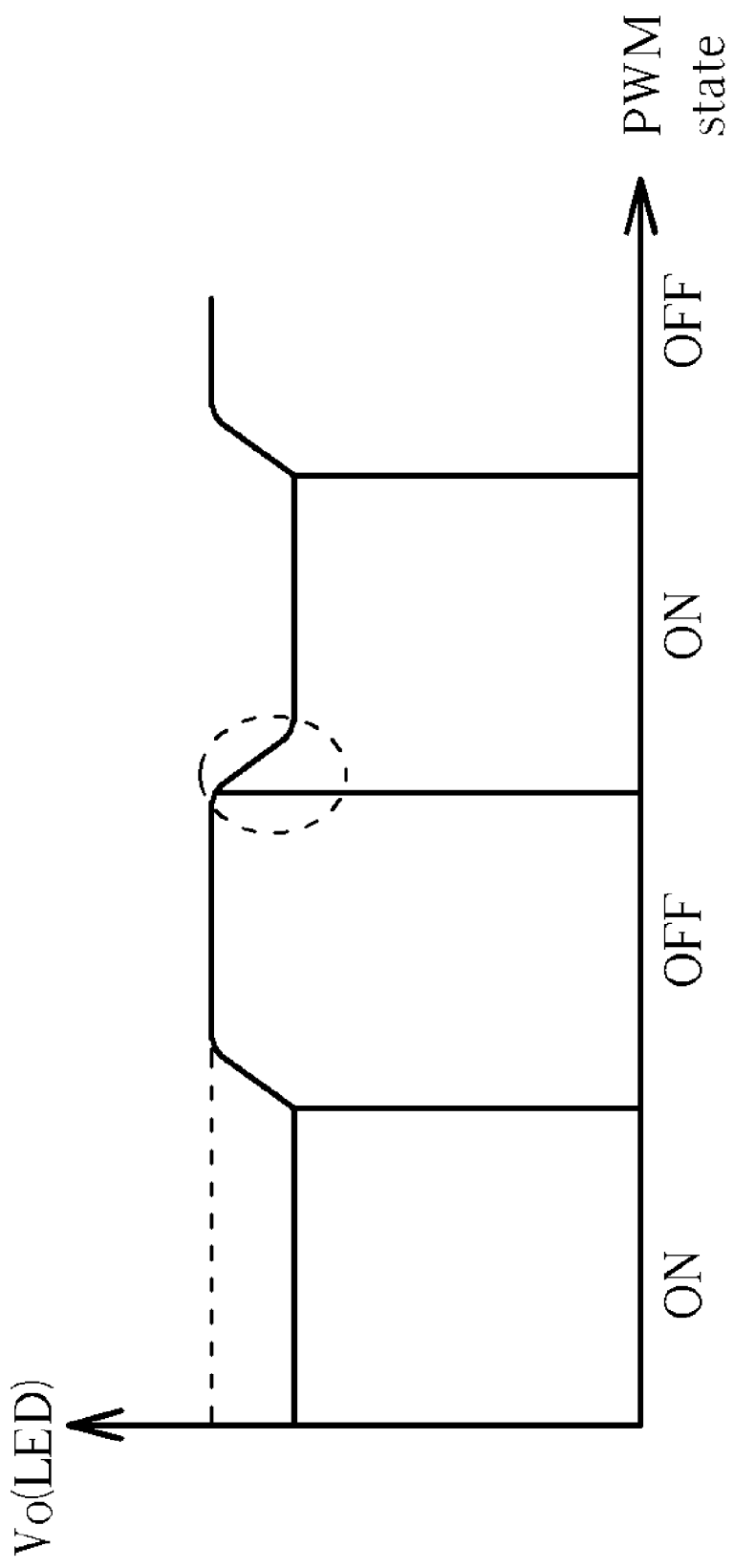
FIG. 2 is a schematic diagram of the operating voltage across the plurality of light emitting diodes versus the voltage level of the pulse width modulation signal PWM2 shown in FIG. 1.
Figure 3:
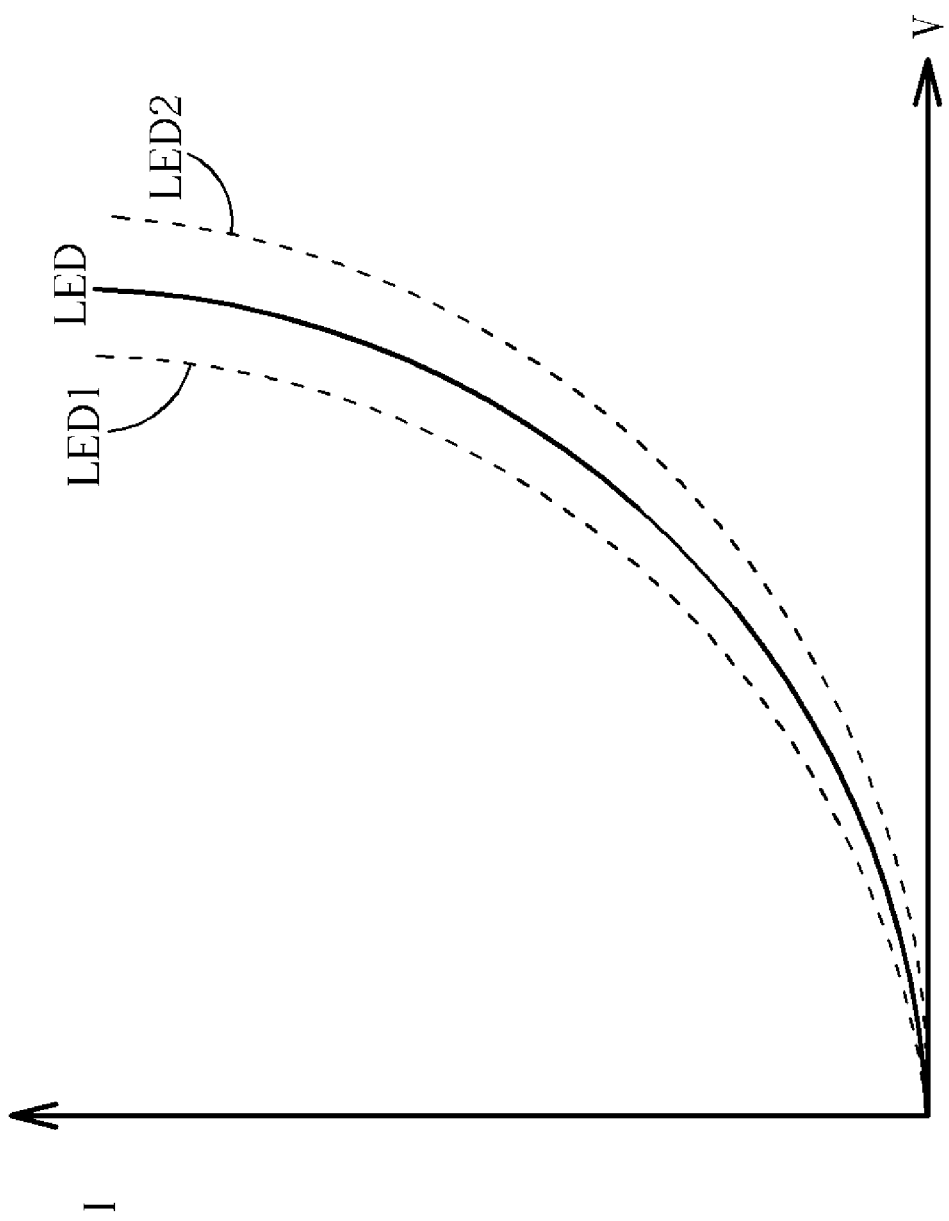
FIG. 3 is a schematic diagram of the operating voltage of the plurality of light emitting diodes versus the operating current of the plurality of light emitting diodes shown in FIG. 1 while the plurality of light-emitting diodes is under external luminance-modulation.

When the voltage level of the PWM signal source 410 is switched from high to low again, the first switch 408 is switched off again, and the voltage difference on the fifth resistor 432 dissipates. As described above, a negative output voltage is outputted by the first operational amplifier 414 again according to a comparison between the positive and the negative input terminals of the first operational amplifier 414, and is blocked by the first diode 418 having a negative voltage difference so that the first capacitor 420 ceases charging. At this time, since the voltage level at the second terminal of the first diode 418 is higher than the voltage level at the first terminal of the first diode 418, the first diode 418 is not conducted. Note that the negative output voltage outputted from the first operational amplifier 418 is located at the first terminal of the first diode 418. Under such a condition, the first capacitor 420 begins discharging to the third resistor 426 along a path through both the second resistor 422 and the second diode 424. When the voltage level at the PWM signal source 410 is switched from high to low again, the voltage level of the output voltage $V_{out}$ is maintained instead of being decreased as in FIG. 2, because the voltage V at the intersection of the third resistor 426 and the fourth 430, is also maintained as a result of the first capacitor 420 applied a current to the third resistor 426. Therefore, the voltage level of the output voltage $V_{out}$ is kept the same no matter whether the PWM signal source 410 is high or low. According to the above descriptions, there are no burst voltages or burst currents, i.e., spikes, in the power supply of the present invention, and the defects in the conventional power supply are also neutralized.

Figure 5:
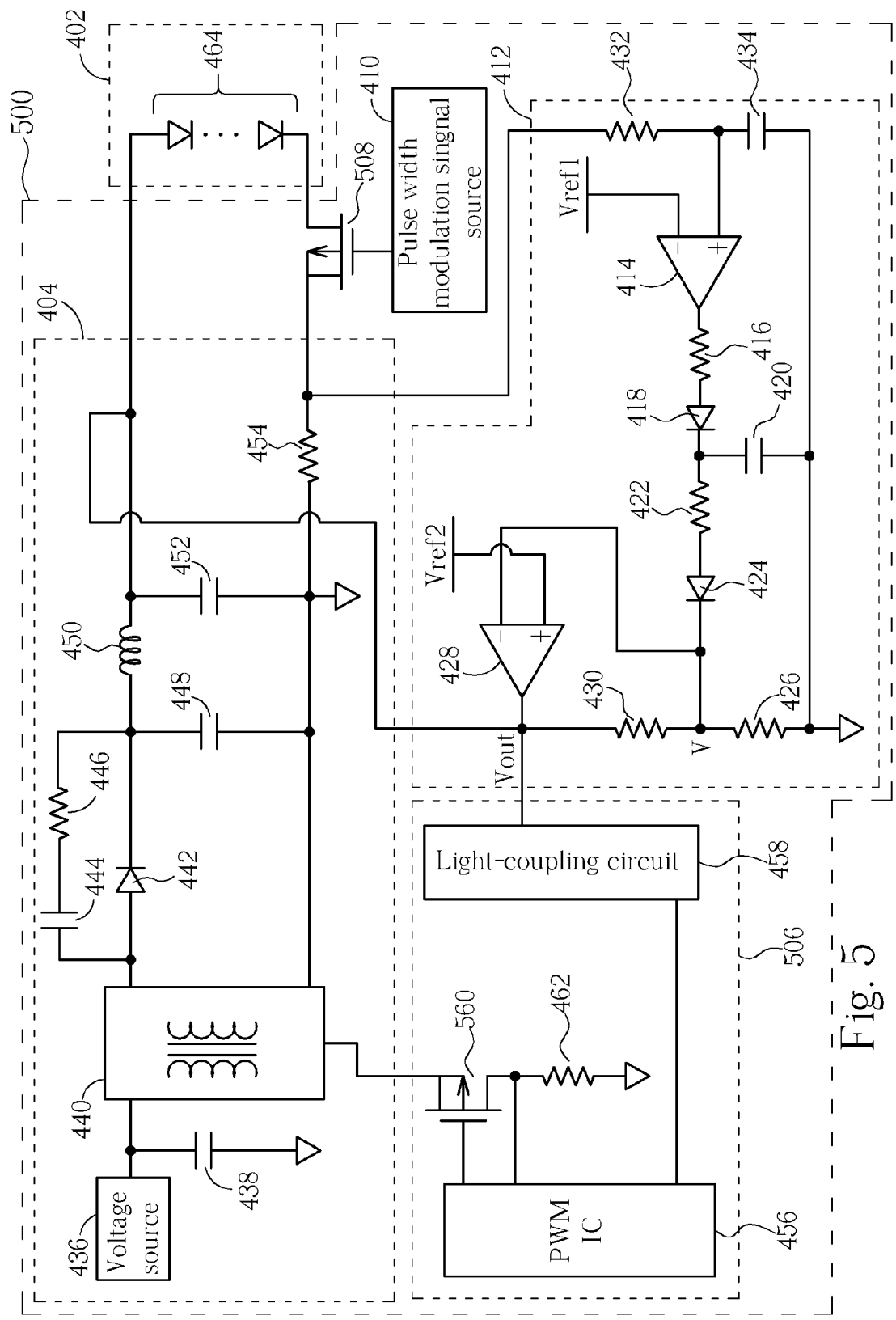
FIG. 5 is a diagram of a power supply according to another embodiment of the invention.

It has been mentioned before that each of the first switch 408 and the second switch 460 may be implemented with an N type metal oxide semiconductor transistor or a P type metal oxide semiconductor transistor. Please refer to FIG. 5, which illustrates a power supply 500 according to another embodiment of the invention generated by replacing both the first and second switches 408 and 460 shown in FIG. 4 with P type metal oxide semiconductor transistors 508 and 560, and the power controlling circuit 406 is replaced with a power controlling circuit 506. Operations and related couplings are similar with those described with respect to the power supply 400 shown in FIG. 4, so the operations and related couplings are not repeatedly described herein for brevity.

A power supply for relieving spikes is disclosed in the present invention for relieving and preventing burst voltages and burst currents in the conventional power supply from damaging passive elements. In the power supply of the present invention, when the pulse width modulation signal is high, sufficient electricity is stored with a capacitor so as to maintain the voltage level of an output voltage by regulating the discharging path of the capacitor when the pulse width modulation signal is switched from high to low. When the power supply for relieving spikes of the present invention is applied on a light supply, burst currents and burst voltages of a corresponding light module are neutralized. The power supply disclosed in the present invention is not merely applied on light modules but also on other power supplying systems requiring feedback circuits for relieving spikes.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

Those skilled in the art will readily observe that numerous modifications and alterations of the device and method may be made while retaining the teachings of the invention.

What is claimed is:

1. A power supply comprising:
   a power supplying circuit;
   a power controlling circuit having an output terminal coupled to an input terminal of the power supplying circuit;
   a first switch;
   a pulse width modulation signal source coupled to a first terminal of the first switch; and
   a feedback circuit comprising:
      a first operational amplifier having a first input terminal coupled to a first reference voltage source, and a second input terminal coupled to a second terminal of the first switch;
      a first resistor having a first terminal coupled to an output terminal of the first operational amplifier;
      a first diode having a first terminal coupled to a second terminal of the first resistor;
      a first capacitor having a first terminal coupled to a second terminal of the first diode, and a second terminal coupled to ground;
      a second resistor having a first terminal coupled to the second terminal of the first diode;
      a second diode having a first terminal coupled to a second terminal of the second resistor;
      a third resistor having a first terminal coupled to a second terminal of the second diode, and a second terminal coupled to the second terminal of the first capacitor;
      a second operational amplifier having a first input terminal coupled to a second reference voltage source, a second input terminal coupled to the second terminal of the second diode, and an output terminal coupled to an input terminal of the power controlling circuit; and
      a fourth resistor having a first terminal coupled to the output terminal of the second operational amplifier, and a second terminal coupled to the first terminal of the third resistor.

2. The power supply of claim 1 wherein the feedback circuit further comprises:
   a fifth resistor having a first terminal coupled to the second terminal of the first switch; and
   a second capacitor having a first terminal coupled to a second terminal of the fifth resistor, and a second terminal coupled to the second terminal of the first capacitor.

3. The power supply of claim 1 wherein the power supplying circuit comprises:
   a voltage source;
   a third capacitor having a first terminal coupled to the voltage source, and a second terminal coupled to ground;
   a transformer having a first input terminal coupled to the first terminal of the third capacitor, a second input terminal coupled to the output terminal of the power controlling circuit, and a first output terminal coupled to ground;
   a third diode having a first terminal coupled to a second output terminal of the transformer;
   a fourth capacitor having a first terminal coupled to the first terminal of the third diode;
   a sixth resistor having a first terminal coupled to a second terminal of the fourth capacitor, and a second terminal coupled to a second terminal of the third diode;
   a fifth capacitor having a first terminal coupled to the second terminal of the third diode, and a second terminal coupled to the first output terminal of the transformer;
   an inductor having a first terminal coupled to the second terminal of the third diode;
   a sixth capacitor having a first terminal coupled to a second terminal of the inductor, and a second terminal coupled to the first output terminal of the transformer; and
   a seventh resistor having a first terminal coupled to the first output terminal of the transformer, and a second terminal coupled to the second terminal of the first switch.

4. The power supply of claim 1 wherein the power controlling circuit comprises:
   a pulse width modulation circuit;
   a light coupling circuit having an input terminal coupled to the output terminal of the second operational amplifier, and an output terminal coupled to an input terminal of the pulse width modulation circuit;
   a second switch having a first terminal coupled to a first output terminal of the pulse width modulation circuit, a second terminal coupled to an second output terminal of the pulse width modulation circuit, and a third terminal coupled to the input terminal of the power supplying circuit; and
   an eighth resistor having a first terminal coupled to the second output terminal of the pulse width modulation circuit, and a second terminal coupled to ground.

5. The power supply of claim 4 wherein the second switch is an N-type metal oxide semiconductor transistor.

6. The power supply of claim 4 wherein the second switch is a P-type metal oxide semiconductor transistor.

7. The power supply of claim 1 wherein the first switch is an N-type metal oxide semiconductor transistor.

8. The power supply of claim 1 wherein the first switch is a P-type metal oxide semiconductor transistor.

9. The power supply of claim 1 wherein a first output terminal of the power supplying circuit is coupled to an input terminal of a light module for supplying power for the light module.

10. The power supply of claim 9 wherein the light module comprises a plurality of light emitting diodes, the plurality of the light emitting diodes including a first light emitting diode coupled to the output terminal of the second operational amplifier, and a second light emitting diode coupled to a third terminal of the first switch.

* * * * *